US006382087B1

United States Patent
Iiyama

(10) Patent No.: US 6,382,087 B1
(45) Date of Patent: May 7, 2002

(54) COFFEE BEAN ROASTER WITH RECIRCULATED, FILTERED EXHAUST AIRFLOW

(76) Inventor: Sadamu Iiyama, 2940 Grace La., Costa Mesa, CA (US) 92627

( * ) Notice: Subject to any disclaimer, the term of this patent is extended or adjusted under 35 U.S.C. 154(b) by 0 days.

(21) Appl. No.: 09/918,962

(22) Filed: Jul. 31, 2001

(51) Int. Cl.⁷ .......................... A23L 1/18; A23N 12/00; A47J 31/42; A47J 37/04; F26B 3/08
(52) U.S. Cl. .................. 99/355; 99/286; 99/323.4; 99/323.7; 99/427; 99/467; 99/469; 99/476; 99/483; 34/48; 34/225; 34/233; 34/549; 34/594
(58) Field of Search .................... 99/286, 352–355, 99/467–476, 483, 323.4, 323.5, 323.7, 427; 34/48, 54, 63, 67, 72, 77, 79, 82, 57 E, 133, 225, 233, 360, 494, 394, 507, 549, 550, 564, 576, 577, 586, 594, 596, 606; 219/400, 492, 494, 502, 385; 426/466, 467, 469

(56) References Cited

U.S. PATENT DOCUMENTS

| 2,762,289 A | | 9/1956 | Crutcher, Jr. ................. 99/236 |
| 3,660,045 A | | 5/1972 | Gladu .......................... 23/277 |
| 4,271,603 A | * | 6/1981 | Moore, III ................ 34/233 X |
| 4,325,191 A | * | 4/1982 | Kumagai et al. .......... 99/286 X |
| 4,425,720 A | * | 1/1984 | Elevitch ................. 219/386 X |
| 4,484,064 A | * | 11/1984 | Murray ...................... 219/400 |
| 4,494,314 A | * | 1/1985 | Gell, Jr. ..................... 99/323.7 |
| 4,844,721 A | | 7/1989 | Cox et al. ....................... 55/85 |
| 4,860,461 A | * | 8/1989 | Tamaki et al. ............. 99/286 X |
| 4,871,901 A | * | 10/1989 | Igusa et al. ................. 219/400 |
| 5,269,072 A | * | 12/1993 | Waligorski .................... 34/594 |
| 5,343,632 A | | 9/1994 | Dinh ........................... 34/507 |
| 5,359,788 A | * | 11/1994 | Gell, Jr. ................. 99/323.7 X |
| 5,564,331 A | * | 10/1996 | Song ........................... 99/469 |
| 5,609,097 A | * | 3/1997 | Newnan .................. 99/483 X |
| 5,638,607 A | * | 6/1997 | Lemme et al. .......... 219/385 X |
| 5,735,194 A | * | 4/1998 | Cochran ....................... 99/483 |
| 5,928,697 A | | 7/1999 | Argilies Felip ............. 426/466 |
| 6,065,226 A | | 5/2000 | Gell, Jr. ....................... 34/594 |
| 6,122,835 A | | 9/2000 | Khanyutin ..................... 34/79 |

* cited by examiner

Primary Examiner—Timothy F. Simone
(74) Attorney, Agent, or Firm—Stetina Brunda Garred & Brucker

(57) ABSTRACT

In accordance with the present invention, there is provided a coffee bean roaster with recirculated, filtered exhaust airflow. The coffee bean roaster includes a roasting drum sized and configured to receive coffee beans for roasting therein. The roasting drum has a drum airflow inlet and a drum airflow outlet for exhausting airflow from the roasting drum. The coffee bean roaster further includes a blower configured to blow airflow through the drum airflow inlet for venting the roasting drum. The coffee bean roaster includes a fluid filter having a filter airflow inlet and a filter airflow outlet. The filter airflow inlet is in fluid communication with the drum airflow outlet. The fluid filter is configured to filter airflow from the roasting drum. The filter airflow outlet is in fluid communication with the blower for recirculating airflow into the roasting drum.

25 Claims, 2 Drawing Sheets

COFFEE BEAN ROASTER WITH RECIRCULATED, FILTERED EXHAUST AIRFLOW

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to coffee bean roasters, and more particularly to a coffee bean roaster with recirculated, filtered exhaust airflow.

It has long been recognized that the most aromatic and tasteful coffee beverages result from green coffee beans which are freshly roasted, ground and brewed. The flavor of coffee is developed by roasting which results in a pyrolysis process of oils in the coffee beans. Green unroasted coffee beans have a film-like covering which effectively excludes air and moisture thereby protecting the coffee beans. This protective covering on the coffee beans is removed during the roasting process as chaff. Removal of this protective covering leaves roasted coffee beans exposed which results in oxidation of the oils in the coffee beans.

Coffee beans begin losing their flavor and aroma once they are roasted because of such oxidation of the oils. Roasted coffee beans will maintain its flavor reasonably well for approximately one week if sealed in an air tight container to minimize oxidation of the oils. Ground roasted coffee loses a significant amount of flavor after being ground, and will maintain its flavor reasonably well for only a few days. In contrast, green coffee beans may be kept for years with minimal effects upon their flavor characteristics, other than a mellowing as with aging of a fine wine.

Traditionally, retail outlets for roasted coffee beans, ground coffee and coffee beverages purchase roasted coffee beans from distributors. In order to raise the level of coffee freshness, however, some retail outlets have begun to roast green coffee beans on-site in coffee bean roasters.

The typical roasting process results in smoke and various gases evolved from the coffee beans. Such smoke and fumes need to be exhausted from the coffee bean roaster in order to prevent the flavor characteristics of the roasted coffee beans being affected. In the retail settings, direct ventilation piping from the coffee bean roaster to outside of the establishment is typically required. Such ventilation piping may require modifying the premises for costly, inconvenient installation of such piping through a wall or ceiling. Such installation may be considered aesthetically unpleasing. Moreover, such installation may undesirably subject the establishment to any variety of health and safety regulations. Further, direct venting of the resulting smoke and fumes is not considered environmentally sensitive.

It is therefore evident that there exists a need in the art for a more efficient apparatus and method of handling the exhaust smoke and fumes from coffee bean roasters in comparison to the prior art.

BRIEF SUMMARY OF THE INVENTION

In accordance with an embodiment of the present invention, there is provided a coffee bean roaster with recirculated, filtered exhaust airflow. The coffee bean roaster includes a roasting drum sized and configured to receive coffee beans for roasting therein. The roasting drum has a drum airflow inlet and a drum airflow outlet for exhausting airflow from the roasting drum. The coffee bean roaster further includes a blower configured to blow airflow through the drum airflow inlet for venting the roasting drum. The coffee bean roaster further includes a fluid filter having a filter airflow inlet and a filter airflow outlet. The filter airflow inlet is in fluid communication with the drum airflow outlet. The fluid filter is configured to filter airflow from the roasting drum. The filter airflow outlet is in fluid communication with the blower for recirculating airflow into the roasting drum.

As such, during and after the roasting process, airflow containing smoke and fumes evolved from the coffee beans may be vented from the roasting drum to the fluid filter. The fluid filter effectively scrubs the airflow of particulates and gases associated with smoke and fumes. The cleansed airflow is then recirculated to the blower and the roasting drum. Advantageously, such recirculation avoids usage of ventilation piping from the roasting drum to outside of the establishment as in prior art coffee bean roasters. In this regard, the present invention is contemplated to provide a coffee bean roaster which is cost effective, aesthetically pleasing and environmentally sensitive in comparison to prior art devices. Moreover, because of the closed, self contained nature of the present invention, a proprietor of an establishment utilizing a coffee bean roaster of the present invention may display the same for customers to readily observe. In this regard, customers can see for themselves the freshness of roasted coffee beans and ground coffee beans and beverages obtained therefrom.

In an embodiment of the present invention, the fluid filter is a water-based filter. Further, the coffee bean roaster includes a fluid source sized and configured to provide fluid to the fluid filter. The fluid filter has at least one screen, which may comprise multiple screens. The fluid source is sized and configured to distribute fluid across the screen. The screen is positioned between the filter airflow inlet and the filter airflow outlet for passage of airflow through the screen from the filter airflow inlet to the filter airflow outlet. The screen has an upper end and a lower end, and the fluid source is sized and configured to dispense fluid adjacent the upper end for distributing fluid across the screen towards the lower end. The coffee bean roaster further includes a fluid reservoir sized and configured to receive fluid from the screen. The fluid reservoir is disposed in fluid communication with the fluid source for recirculating fluid to the fluid filter.

The coffee bean roaster may further include a secondary filter sized and configured to remove fluid vapor from the airflow. The secondary filter is disposed in fluid communication with the filter airflow outlet of the fluid filter and the blower. A fluid source sized and configured may be provided to provide fluid to the fluid filter. The fluid source may be sized and configured to receive condensed fluid vapor removed from the airflow by the secondary filter for recirculation to the fluid filter. The coffee bean roaster may further include a chaff collector sized and configured to remove chaff from the airflow. The chaff collector may be disposed in fluid communication with the roasting drum and the filter airflow inlet of the fluid filter. The coffee bean roaster may further include a drum housing. The roasting drum and the blower are disposed within the drum housing. The fluid filter may further include a filter housing. The filter housing may be integrated with the drum housing. Alternatively, the filter housing may be detachable from the drum housing.

In accordance with another embodiment of the present invention, there is provided an exhaust filter system for use with a coffee bean roaster. The coffee bean roaster has a roasting drum sized and configured to receive coffee beans for roasting therein. The roasting drum has a drum airflow inlet and a drum airflow outlet for exhausting airflow from the roasting drum. The coffee bean roaster further has a blower configured to blow airflow through the drum airflow inlet for venting the roasting drum. The exhaust filter system includes a fluid filter having a filter airflow inlet and a filter airflow outlet. The filter airflow inlet is disposable in fluid communication with the drum airflow outlet. The fluid filter is configured to filter airflow from the roasting drum. The filter airflow outlet is disposable in fluid communication with the blower for recirculating airflow into the roasting drum.

In an embodiment of the present invention, the fluid filter is a water-based filter. Further, the exhaust filter system includes a fluid source sized and configured to provide fluid to the fluid filter. The fluid filter has at least one screen, which may comprise multiple screens. The fluid source is sized and configured to distribute fluid across the screen. The screen is positioned between the filter airflow inlet and the filter airflow outlet for passage of airflow through the screen from the filter airflow inlet to the filter airflow outlet. The screen has an upper end and a lower end, and the fluid source is sized and configured to dispense fluid adjacent the upper end for distributing fluid across the screen towards the lower end. The exhaust filter system further includes a fluid reservoir sized and configured to receive fluid from the screen. The fluid reservoir is disposed in fluid communication with the fluid source for recirculating fluid to the fluid filter.

The exhaust filter system may further include a secondary filter sized and configured to remove fluid vapor from the airflow. The secondary filter is disposed in fluid communication with the filter airflow outlet of the fluid filter and the blower. A fluid source sized and configured may be provided to provide fluid to the fluid filter. The fluid source may be sized and configured to receive condensed fluid vapor removed from the airflow by the secondary filter for recirculation to the fluid filter. The coffee bean roaster may further include a chaff collector sized and configured to remove chaff from the airflow. The chaff collector may be disposed in fluid communication with the roasting drum and the filter airflow inlet of the fluid filter.

Accordingly, the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
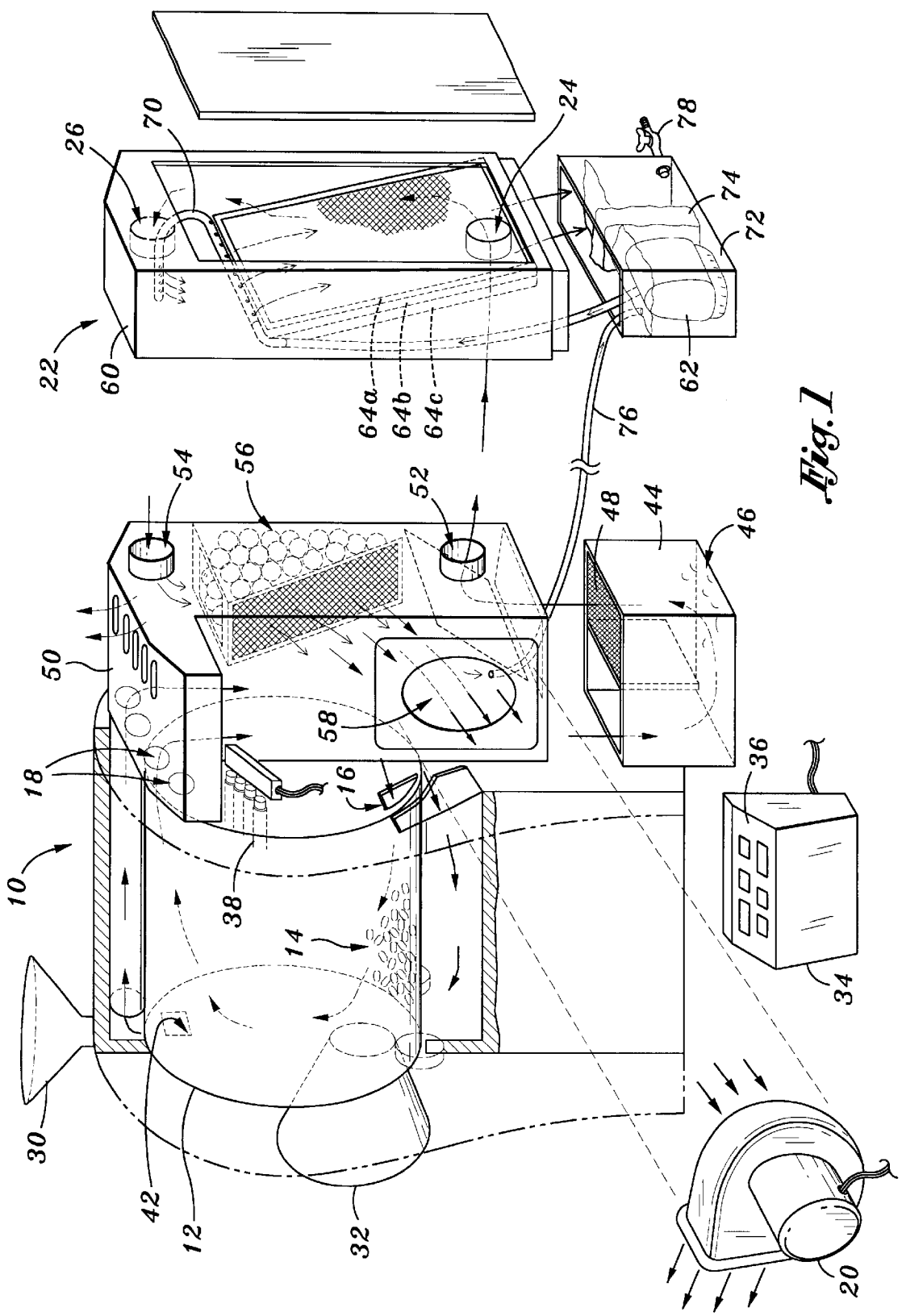
FIG. 1 is an exploded perspective view of a coffee bean roaster with recirculated, filtered exhaust airflow according to the present invention.
Figure 2:
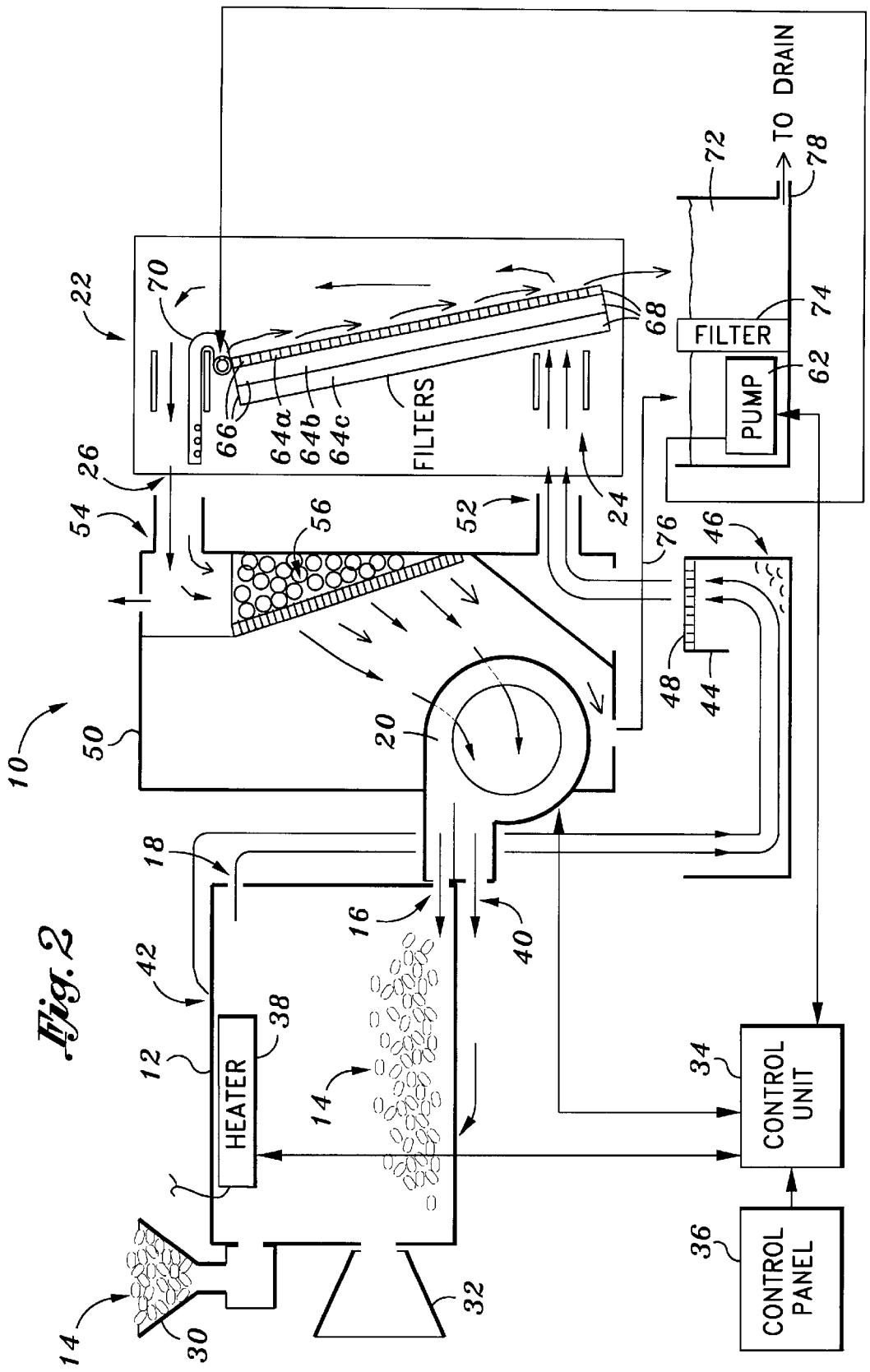
FIG. 2 is a symbolic diagram illustrating a coffee bean roaster according to the present invention.

Referring now to the drawings wherein the showings are for purposes of illustrating a preferred embodiment of the present invention only, and not for purposes of limiting the same, FIGS. 1 and 2 illustrate a coffee bean roaster with recirculated, filtered exhaust airflow according to the present invention.

In an embodiment of the present invention, there is provided a coffee bean roaster 10 with recirculated, filtered exhaust airflow. The coffee bean roaster 10 includes a roasting drum 12 sized and configured to receive coffee beans 14 for roasting therein. The roasting drum 12 has a drum airflow inlet 16 and a drum airflow outlet 18 for exhausting airflow from the roasting drum 12. The coffee bean roaster 10 further includes a blower 20 configured to blow airflow through the drum airflow inlet 16 for venting the roasting drum 12. The coffee bean roaster 10 further includes a fluid filter 22 having a filter airflow inlet 24 and a filter airflow outlet 26. The filter airflow inlet 24 is in fluid communication with the drum airflow outlet 18. The fluid filter 22 is configured to filter airflow from the roasting drum 12. The filter airflow outlet 26 is in fluid communication with the blower 20 for recirculating airflow into the roasting drum 12.

According to an embodiment of the present invention, the coffee bean roaster 10 may further include a drum housing 28. The drum housing 28 may include a funnel 30 which extends towards the interior of the roasting drum 12 used for filling the roasting drum 12 with the coffee beans 14 ready to be roasted. The drum housing 28 may further have a dispensing port 32 which extends from the roasting drum 12 for removal the coffee beans 14 after roasting from the roasting drum 12. The roasting drum 12 is disposed within the drum housing 28. The roasting drum 12 in configured to rotate for agitating the coffee beans 16 during the roasting process. In this regard, the rotation of the roasting drum 12 may be controlled through a control unit 34. An operator may manipulate the control unit 34 through a control panel 36.

The coffee bean roaster 10 may further include a heater 38 disposed within the roasting drum 12 for heating airflow within the roasting drum 12. The heater 38 is in electrical communication with the control unit 34 for regulating the temperature of the heater 38. In operation, the heater 38 is activated to roast the coffee beans 14 within the roasting drum 12. Other heating arrangements may be utilized, such as a more direct heating by the roasting drum 12 itself.

As the roasting process is contemplated to result in smoke and various gases evolved from the coffee beans 14, the blower 20 is utilized to effectively vent the roasting drum 12. Moreover, chaff developed from the roasting coffee beans 14 may also vented. The blower 20 may be disposed within or attached to the drum housing 28, and is disposed in electrical communication with the control unit 34 for regulating the airflow output of the blower 20.

In addition, the roasting process not only requires application of heat, but also requires specific cooling procedures. In this regard, the venting of the roasting drum 12 by the blower 20 facilitates such cooling. Further, the drum housing 28 may include an outer drum airflow inlet 40 and an outer drum airflow outlet 42 which are configured to receive and vent airflow away from the exterior of the blower 20 for cooling the blower 20. In this regard, the blower 20 blows airflow about the outer drum airflow inlet 40 which exits via the outer drum airflow outlet 42 of the drum housing 28. Advantageously, as further discussed below, recirculation of airflow from the fluid filter 22 further facilitates the cooling process as the fluid filter 22 allows for cooling of the airflow passing though it.

The coffee bean roaster 10 may further include a chaff collector 44 sized and configured to remove chaff 46 from the airflow. The chaff collector 44 may be disposed in fluid communication with the roasting drum 12 and the filter airflow inlet 24 of the fluid filter 22. In particular, airflow from the drum airflow outlet 18 is configured to enter the chaff collector 44 which may include a screen 48 which traps the chaff 46 in the chaff collector 44 while allowing the airflow to pass.

In an embodiment of the present invention, an intermediate housing 50 may be provided. The intermediate housing 50 may be configured as a passage for airflow from the drum airflow outlet 18 and the outer drum airflow outlet 42 to the chaff collector 44. The intermediate housing 50 may be attached to the drum housing 28 or even integrated therewith. Further, the chaff collector 44 may be attached to the intermediate housing 50 or even integrated therewith. The intermediate housing 50 is configured to allow passage of airflow from the chaff collector 44 through an outlet 52 which is disposed in fluid communication with the filter airflow inlet 24.

The intermediate housing 50 may further have an inlet 54 which is disposed in fluid communication with the filter airflow outlet 26 for receiving airflow therefrom. A secondary filter 56 may be disposed within the intermediate housing 50 which is sized and configured to remove fluid vapor from the airflow. In this regard, the secondary filter 56 may include steel wool like material therein. The intermediate housing 50 may further include a return port 58 which is disposed in fluid communication with the blower 20 for recirculating airflow from the fluid filter 22 to the roasting drum 12.

The fluid filter 22 may further include a filter housing 60. The filter housing 22 may be attached to or integrated with the intermediate housing 50. To the extent that an intermediate housing 50 is not utilized, the filter housing 22 may be attached to or integrated with the drum housing 28. Alternatively, the filter housing 60 may be detachable from the drum housing 28 or even located remote from the drum housing 28 while still being in operable communication therewith. Airflow enters the filter housing 60 via the filter airflow inlet 24.

Preferably, the fluid filter 22 is a water-based filter. Further, a fluid source 62 may be sized and configured to provide fluid to the fluid filter 22. In this regard, the fluid source 62 may take the form of a fluid pump. The fluid source 62 may be in electrical communication with the control unit 34 for controlling the activation of the fluid source 62 for delivery of fluid to the fluid filter 22.

The fluid filter 22 preferably has at least one screen 64 (individually denoted as 64a–c as shown), which may comprise multiple screens 64a–c. The screens 64a–c may take the form of a wire mesh. The fluid source 62 is sized and configured to distribute fluid across the screens 64a–c. In the embodiment shown, the screens 64a–c are positioned between the filter airflow inlet 24 and the filter airflow outlet 26 for passage of airflow through the screen 64a–c from the filter airflow inlet 24 to the filter airflow outlet 26. Each of the screens 64a–c may have an upper end 66 and a lower end 68, and the fluid source 62 is sized and configured to dispense fluid adjacent the upper ends 66 for distributing fluid across the screens 64a–c towards the lower ends 68. A distribution hose 70 may be provided in fluid communication with the fluid source 62 for distributing fluid adjacent the screens 64a–c. The distribution hose 70 may further be disposed adjacent the secondary filter 56.

In operation, the screens 64a–c become saturated with fluid and effectively forms a fluid barrier with respect to the airflow passing through the fluid filter 22. Thus, airflow originating from the roasting drum 12 passes through the filter airflow inlet 24 which may be disposed adjacent a lower end of the fluid filter 22. The airflow which may have an elevated temperature tends to rise towards the filter airflow outlet 26. In so doing, the airflow passes through the fluid saturated screens 64a–c which tends to scrub the airflow of particulates and gases associated with smoke and fumes evolved from the coffee beans 14 during roasting.

A fluid reservoir 72 may be provided which is sized and configured to receive fluid from the screens 64a–c. Further, the fluid reservoir 72 may be disposed in fluid communication with the fluid source 62 for recirculating fluid to the fluid filter 22. In this regard, a filter 74, such as a sponge type filter, may be disposed in the fluid reservoir for cleaning fluid after filtering of the airflow. The fluid reservoir 72 may have a spigot 78 for drainage of the fluid reservoir 72 for changing of the fluid as the recirculated fluid may eventually become too dirty for effective airflow scrubbing despite that use of the filter 74.

The fluid source 62 may be sized and configured to receive condensed fluid vapor removed from the airflow by the secondary filter 56 for recirculation to the fluid filter 22. In this regard, a return hose 76 may be provided between the intermediate housing 50 and the fluid reservoir 72. It is contemplated that the secondary filter 56 may further facilitate a cooling of the airflow.

According to another aspect of the present invention, an exhaust filter system may be utilized with a coffee bean roaster. In this regard, the exhaust filter system includes a fluid filter 22 as described above for use with a coffee bean roaster having a roasting drum such as roasting drum 22 and a blower such as blower 20. Such an exhaust filter system may be retrofitted to existing coffee bean roasters or supplied separately from coffee bean roasters.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A coffee bean roaster with recirculated, filtered exhaust airflow comprising:
    a roasting drum sized and configured to receive coffee beans for roasting therein, the roasting drum having a drum airflow inlet and a drum airflow outlet for exhausting airflow from the roasting drum;
    a blower configured to blow airflow through the drum airflow inlet for venting the roasting drum; and
    a fluid filter having a filter airflow inlet and a filter airflow outlet, the filter airflow inlet being in fluid communication with the drum airflow outlet, the fluid filter being configured to filter airflow from the roasting drum, the filter airflow outlet being in fluid communication with the blower for recirculating airflow into the roasting drum.

2. The coffee bean roaster of claim 1 wherein the fluid filter is a water-based filter.

3. The coffee bean roaster of claim 1 further comprises a fluid source sized and configured to provide fluid to the fluid filter.

4. The coffee bean roaster of claim 3 wherein the fluid filter has at least one screen, the fluid source is sized and configured to distribute fluid across the screen, the screen is positioned between the filter airflow inlet and the filter airflow outlet for passage of airflow through the screen from the filter airflow inlet to the filter airflow outlet.

5. The coffee bean roaster of claim 4 wherein the screen has an upper end and a lower end, the fluid source is sized and configured to dispense fluid adjacent the upper end for distributing fluid across the screen towards the lower end.

6. The coffee bean roaster of claim 5 further comprises a fluid reservoir sized and configured to receive fluid from the screen.

7. The coffee bean roaster of claim 6 wherein the fluid reservoir is disposed in fluid communication with the fluid source for recirculating fluid to the fluid filter.

8. The coffee bean roaster of claim 4 wherein the at least one screen comprises multiple screens.

9. The coffee bean roaster of claim 1 further comprises a secondary filter sized and configured to remove fluid vapor from the airflow, the secondary filter is disposed in fluid communication with the filter airflow outlet of the fluid filter and the blower.

10. The coffee bean roaster of claim 9 further comprises a fluid source sized and configured to provide fluid to the fluid filter, the fluid source is sized and configured to receive condensed fluid vapor removed from the airflow by the secondary filter for recirculation to the fluid filter.

11. The coffee bean roaster of claim 1 further comprises a chaff collector sized and configured to remove chaff from the airflow, the chaff collector is disposed in fluid communication with the roasting drum and the filter airflow inlet of the fluid filter.

12. The coffee bean roaster of claim 1 further comprises a drum housing, the roasting drum and the blower are disposed within the drum housing, the fluid filter further includes a filter housing.

13. The coffee bean roaster of claim 12 wherein the filter housing is integrated with the drum housing.

14. The coffee bean roaster of claim 12 wherein the filter housing is detachable from the drum housing.

15. An exhaust filter system for use with a coffee bean roaster, the coffee bean roaster having a roasting drum sized and configured to receive coffee beans for roasting therein, the roasting drum having a drum airflow inlet and a drum airflow outlet for exhausting airflow from the roasting drum, the coffee bean roaster further having a blower configured to blow airflow through the drum airflow inlet for venting the roasting drum, the exhaust filter system comprising:

a fluid filter having a filter airflow inlet and a filter airflow outlet, the filter airflow inlet being disposable in fluid communication with the drum airflow outlet, the fluid filter being configured to filter airflow from the roasting drum, the filter airflow outlet being disposable in fluid communication with the blower for recirculating airflow into the roasting drum.

16. The exhaust filter system of claim 15 wherein the fluid filter is a water-based filter.

17. The exhaust filter system of claim 15 further comprises a fluid source sized and configured to provide fluid to the fluid filter.

18. The exhaust filter system of claim 17 wherein the fluid filter has at least one screen, the fluid source is sized and configured to distribute fluid across the screen, the screen is positioned between the filter airflow inlet and the filter airflow outlet for passage of airflow through the screen from the filter airflow inlet to the filter airflow outlet.

19. The exhaust filter system of claim 18 wherein the screen has an upper end and a lower end, the fluid source is sized and configured to dispense fluid adjacent the upper end for distributing fluid across the screen towards the lower end.

20. The exhaust filter system of claim 19 further comprises a fluid reservoir sized and configured to receive fluid from the screen.

21. The exhaust filter system of claim 20 wherein the fluid reservoir is disposed in fluid communication with the fluid source for recirculating fluid to the fluid filter.

22. The exhaust filter system of claim 18 wherein the at least one screen comprises multiple screens.

23. The exhaust filter system of claim 15 further comprises a secondary filter sized and configured to remove fluid vapor from the airflow, the secondary filter is disposed in fluid communication with the filter airflow outlet of the fluid filter and the blower.

24. The exhaust filter system of claim 23 further comprises a fluid source sized and configured to provide fluid to the fluid filter, the fluid source is sized and configured to receive condensed fluid vapor removed from the airflow by the secondary filter for recirculation to the fluid filter.

25. The exhaust filter system of claim 15 further comprises a chaff collector sized and configured to remove chaff from the airflow, the chaff collector is disposable in fluid communication with the roasting drum and the filter airflow inlet of the fluid filter.

* * * * *